C. R. IRVINE.
VEHICLE TIRE.
APPLICATION FILED JAN. 7, 1920.
1,352,370.
Patented Sept. 7, 1920.
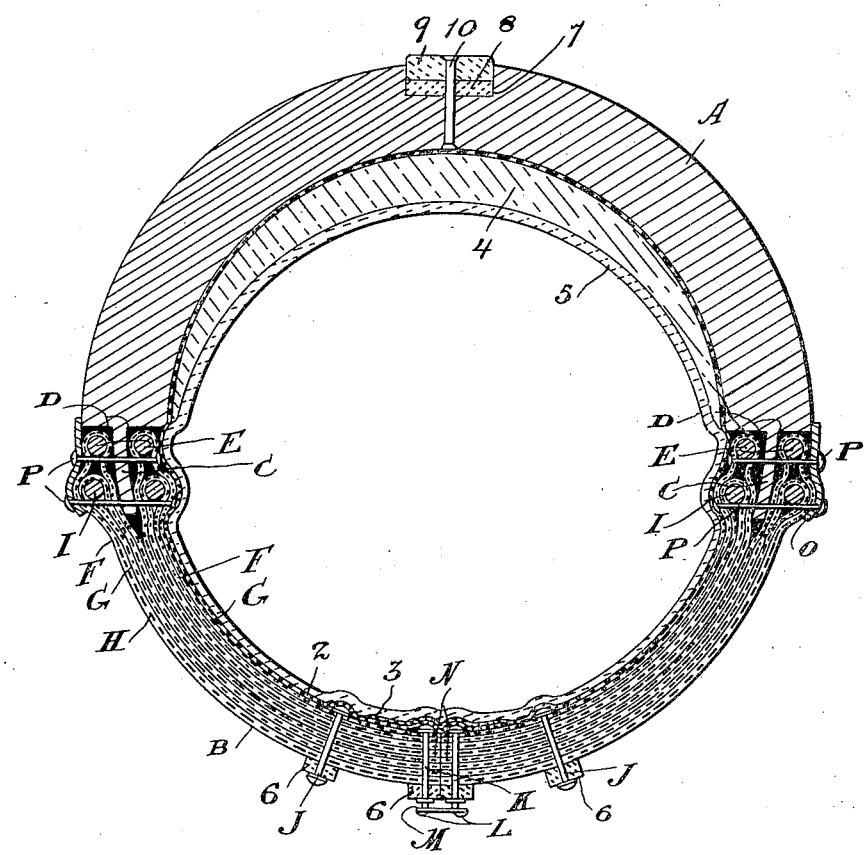
Inventor
C. R. Irvine
Egerton R. Case
By
Attorney

UNITED STATES PATENT OFFICE.

CHARLES ROBERT IRVINE, OF PETROLIA, ONTARIO, CANADA.

VEHICLE-TIRE.

1,352,370.  Specification of Letters Patent.  Patented Sept. 7, 1920.

Application filed January 7, 1920. Serial No. 349,895.

*To all whom it may concern:*

Be it known that I, CHARLES ROBERT IRVINE, agent, a subject of the King of Great Britain, of the town of Petrolia, in county of Lambton, Province of Ontario, Canada, have invented certain new and useful Improvements in Vehicle-Tires, of which the following is a specification.

My invention relates to improvements in vehicle tires, and relates more particularly to the armored type of vehicle tire, and the objects of my invention are: Firstly, to construct a tire for various uses that is much more durable than the ordinary unarmored type that is now on the market and one that is not liable to "blowouts" and puncturing: secondly, to provide a tire of the class described which can, in the first instance, be made more cheaply than the present tires and the cost of maintenance of which will be practically *nil*, since parts constructed chiefly of rubber used therewith are not exposed to the weather and to rough usage, and thirdly, to construct a tire of the class described which will retain all the elasticity of the ordinary vehicle tire now on the market, and in the following specification, and in the drawings forming part thereof, I shall describe and illustrate one embodiment of my invention, and the parts I claim as new will be set forth in the claims forming part of this specification.

The drawing shows a transverse section through the vehicle tire embodying the various features of my invention.

The tire casing comprises a metal sheathing A which embraces substantially one-half the air-tube, and a flexible divided closure member B suitably coupled to said sheathing. The said metal sheathing can be made in various ways, and it is not necessary to particularly set forth the various ways in which the said sheathing may be made.

Each side of the sheathing is provided with a coupling element or tongue C, and these tongues extend circumferentially of the casing. Positioned in the corners D formed at the juncture of the tongue C with the sheathing A, are wires E, which extend circumferentially of the casing. The lines F and G represent layers of canvas or similar material, reinforced by any suitable material H, such as wire netting. The canvas or other fabric is treated with any suitable waterproofing material such as rubber, and the layers are securely attached to the reinforced material H. Positioned opposite each side of the tongue C, are a pair of wires I, and looped around these wires, as well as around the wires E, are the layers of reinforced canvas before mentioned. The various layers are secured together by any suitable means such as rivets J, and the inner series of rivets K are provided with hook-shaped ends L over which is laced any suitable lacing such as wire M so as to draw tightly together the separated ends N of the flexible closure member B.

O are plates extending circumferentially of the casing and overlapping the inner edges of the metal sheathing A. P are rivets positioned between the pairs of wires E and I, and passing through the tongues C, and the reinforced flexible closure member B, and whereby the said plates O are securely held in the desired position.

2 is a reinforced lining for the casing described, and the same is made to have its edges 3 readily overlapping. This lining prevents any of the rivet heads or other projections from coming into contact with the air-tube. 4 is a cresent-shaped packing made of rubber and the same is located within the metal sheathing A, and against portion of the lining 2. This said packing adds to the elasticity of the tire in that sudden jarring of the metal sheathing A inwardly against the air-tube 5 is largely absorbed before it reaches said air-tube. If desired, the said packing may be omitted, depending upon the weight the tire is constructed to carry. 5 is the air tube. This air-tube, because of the divided closure member B, can be readily inserted within the casing and removed therefrom, and then the ends 3 of the lining 2 are overlapped and then the lace M placed in position around the hooks L.

6 are a plurality of rubber bands coupled to the flexible divided closure member B, and for the purpose of co-acting with the lace M to prevent the flexible divided closure member B from opening.

It will, of course be understood that my tire casing may be mounted on any suitable rim after any suitable manner.

If desired, and in order to additionally strengthen the metal sheathing A, I may form in the tread thereof, a circumferential opening channel or groove 7, and place therein a backing 8 made of wood or other resilient material, and on said backing I mount a binding band or tire 9 made of metal, which also extends into said channel or groove 7. By any suitable means such as rivets 10, the said parts just described may be securely riveted to the metal sheathing A.

While I have described what I consider to be the best embodiment of my invention, I desire it to be understood that the principle may be embodied in different forms, and I desire not to be limited beyond the requirements of the prior art and the terms of my claims.

What I claim is,

1. A vehicle tire comprising a metal sheathing composing the tread and designed to partly inclose the inner tube; a separable reinforced flexible closure member designed to complete the incasing of said tube; a tongue carried by each of the sides of said metal sheathing and extending circumferentially thereof; wires positioned adjacent said tongue, and designed to couple said separable closure member to said metal sheathing, and plates overlapping said metal sheathing at each side of the tire and suitably secured in position to said tongues.

2. A vehicle tire comprising a metal sheathing composing the tread and designed to partly inclose the inner tube, and provided circumferentially with an open channel; binding means mounted in said channel and extending circumferentially around the tire; a separable reinforced flexible closure member designed to complete the incasing of said tube, and coupling means extending circumferentially of said metal sheathing whereby said flexible closure member is coupled thereto.

3. A vehicle tire comprising a metal sheathing composing the tread and designed to partly inclose the inner tube; a separable reinforced flexible closure member designed to complete the incasing of said tube; coupling means extending circumferentially of said metal sheathing whereby said flexible closure member is coupled thereto, and a plurality of rubber bands secured to the portions of said closure member and extending circumferentially of said tire.

4. A vehicle tire comprising a metal sheathing composing the tread and designed to partly inclose the inner tube; a separable reinforced flexible closure member designed to complete the incasing of said tube; coupling means extending circumferentially of said metal sheathing whereby said flexible closure member is coupled thereto; a reinforced lining for said tire, and a packing resting against said lining and extending circumferentially of said sheathing.

CHARLES ROBERT IRVINE.